United States Patent
Saijo et al.

(10) Patent No.: US 11,458,632 B2
(45) Date of Patent: Oct. 4, 2022

(54) ROBOT HAVING REDUCED VIBRATION GENERATION IN IN ARM PORTION

(71) Applicant: SONY CORPORATION, Tokyo (JP)

(72) Inventors: Hiroki Saijo, Chiba (JP); Kiyokazu Miyazawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 266 days.

(21) Appl. No.: 16/639,382

(22) PCT Filed: May 16, 2018

(86) PCT No.: PCT/JP2018/018885
§ 371 (c)(1),
(2) Date: Feb. 14, 2020

(87) PCT Pub. No.: WO2019/039006
PCT Pub. Date: Feb. 28, 2019

(65) Prior Publication Data
US 2020/0171664 A1    Jun. 4, 2020

(30) Foreign Application Priority Data

Aug. 23, 2017 (JP) .............................. JP2017-160395

(51) Int. Cl.
*B25J 9/16* (2006.01)
*B25J 9/00* (2006.01)

(52) U.S. Cl.
CPC ........... *B25J 9/1682* (2013.01); *B25J 9/0087* (2013.01); *B25J 9/1697* (2013.01)

(58) Field of Classification Search
CPC ...... B25J 9/1682; B25J 9/0087; B25J 9/1697; B25J 19/023; B25J 13/087; G05B 2219/40264

(Continued)

(56) References Cited

U.S. PATENT DOCUMENTS

| 7,174,830 B1 * | 2/2007 | Dong ..................... B25J 9/0084 |
| | | 901/1 |
| 9,568,075 B2 * | 2/2017 | Gomi ..................... B25J 9/1635 |

(Continued)

FOREIGN PATENT DOCUMENTS

| EP | 2865498 A2 * | 4/2015 | ................ B25J 5/00 |
| JP | S61-109682 A | 5/1986 | |

(Continued)

OTHER PUBLICATIONS

JP 2013-99807 A English Translation (Year: 2013).*
JP 2017-154221 A English Translation (Year: 2017).*

*Primary Examiner* — B M M Hannan
(74) *Attorney, Agent, or Firm* — Paratus Law Group, PLLC

(57) ABSTRACT

There is provided a robot capable of reducing vibration generated in an arm portion performing work. The robot includes: a first arm portion connected to a body portion and configured to perform work; and a second arm portion connected to the body portion and to be controlled to support the first arm portion, in which the first arm portion includes a first connecting portion connected to the body portion, a first end effector located at an end of the first arm portion opposite to an end where the first connecting portion is located, and a support target portion located between the first connecting portion and the first end effector, and the second arm portion is controlled to support the support target portion.

20 Claims, 7 Drawing Sheets

(58) Field of Classification Search
USPC ........................................................ 700/245
See application file for complete search history.

(56) References Cited

U.S. PATENT DOCUMENTS

| | | | | |
|---|---|---|---|---|
| 10,406,681 B2* | 9/2019 | Murakami | ............. | B25J 9/1682 |
| 2004/0172380 A1* | 9/2004 | Zhang | .................... | B25J 9/1682 |
| 2007/0239315 A1* | 10/2007 | Sato | ........................ | B25J 9/1612 |
| | | | | 700/245 |
| 2011/0004343 A1* | 1/2011 | Iida | ............................ | B25J 9/12 |
| | | | | 700/253 |
| 2011/0071673 A1* | 3/2011 | Ihrke | ........................ | B25J 18/00 |
| | | | | 700/245 |
| 2012/0048027 A1* | 3/2012 | Hashiguchi | ............ | B25J 13/085 |
| | | | | 73/763 |
| 2013/0030569 A1* | 1/2013 | Fudaba | ................ | G05B 19/423 |
| | | | | 700/245 |
| 2013/0345873 A1* | 12/2013 | Blumberg | .............. | B25J 9/1676 |
| | | | | 700/259 |
| 2015/0104283 A1* | 4/2015 | Nogami | ..................... | B25J 9/06 |
| | | | | 414/730 |
| 2015/0104284 A1 | 4/2015 | Riedel | | |
| 2015/0120050 A1* | 4/2015 | Gomi | ........................ | B25J 9/162 |
| | | | | 700/258 |
| 2015/0120058 A1* | 4/2015 | Karito | .................... | B25J 9/1633 |
| | | | | 700/260 |
| 2015/0127141 A1* | 5/2015 | Kawada | ................. | B25J 13/085 |
| | | | | 700/206 |
| 2015/0127160 A1* | 5/2015 | Yamaguchi | ............ | B25J 9/1697 |
| | | | | 700/259 |
| 2016/0059412 A1* | 3/2016 | Oleynik | ..................... | B25J 3/04 |
| | | | | 700/257 |
| 2016/0114492 A1* | 4/2016 | Arakawa | .................. | B25J 9/126 |
| | | | | 414/735 |
| 2016/0306340 A1* | 10/2016 | Nammoto | ............ | G05B 19/402 |
| 2017/0348854 A1* | 12/2017 | Oleynik | .................. | A47J 47/02 |
| 2019/0216576 A1* | 7/2019 | Eyre | ...................... | A61G 13/04 |
| 2019/0337164 A1* | 11/2019 | Hirata | ..................... | B65B 35/16 |
| 2020/0171664 A1* | 6/2020 | Saijo | ...................... | B25J 9/0087 |
| 2021/0106394 A1* | 4/2021 | Cooper | .................. | A61B 34/37 |

FOREIGN PATENT DOCUMENTS

| | | | | |
|---|---|---|---|---|
| JP | H07-328963 | A | | 12/1995 |
| JP | 2006-181648 | A | | 7/2006 |
| JP | 2007-222951 | A | | 9/2007 |
| JP | 2011200971 | A | * | 10/2011 |
| JP | 2013099807 | A | * | 5/2013 |
| JP | 2014-512976 | A | | 5/2014 |
| JP | 2015085459 | A | * | 5/2015 |
| JP | 2017154221 | A | * | 9/2017 |

\* cited by examiner

ROBOT HAVING REDUCED VIBRATION GENERATION IN IN ARM PORTION

CROSS REFERENCE TO PRIOR APPLICATION

This application is a National Stage Patent Application of PCT International Patent Application No. PCT/JP2018/018885 (filed on May 16, 2018) under 35 U.S.C. § 371, which claims priority to Japanese Patent Application No. 2017-160395 (filed on Aug. 23, 2017), which are all hereby incorporated by reference in their entirety.

TECHNICAL FIELD

The present disclosure relates to a robot.

BACKGROUND ART

Heretofore, various robots including a plurality of arm portions have been developed.

For example, Patent Document 1 below discloses a robot that holds a target object with left and right arm portions put on left and right opposed side surfaces of the target object serving as gripping surfaces.

CITATION LIST

Patent Document

Patent Document 1: Japanese Patent Application Laid-Open No. 2007-222951

SUMMARY OF THE INVENTION

Problems to be Solved by the Invention

However, with the technique described in Patent Document 1, there is a possibility that in a situation where, for example, one of the arm portions performs work, strong vibration may occur at the arm portion.

In view of this, the present disclosure proposes a new and improved robot capable of reducing vibration generated in an arm portion performing work.

Solution to Problems

According to the present disclosure, provided is a robot including: a first arm portion connected to a body portion and configured to perform work; and a second arm portion connected to the body portion and to be controlled to support the first arm portion.

Effects of the Invention

As described above, according to the present disclosure, it is possible to reduce vibration generated in an arm portion performing work. Note that effects described here are not necessarily restrictive, and any of the effects described in the present disclosure may be achieved.

MODE FOR CARRYING OUT THE INVENTION

Figure 1:
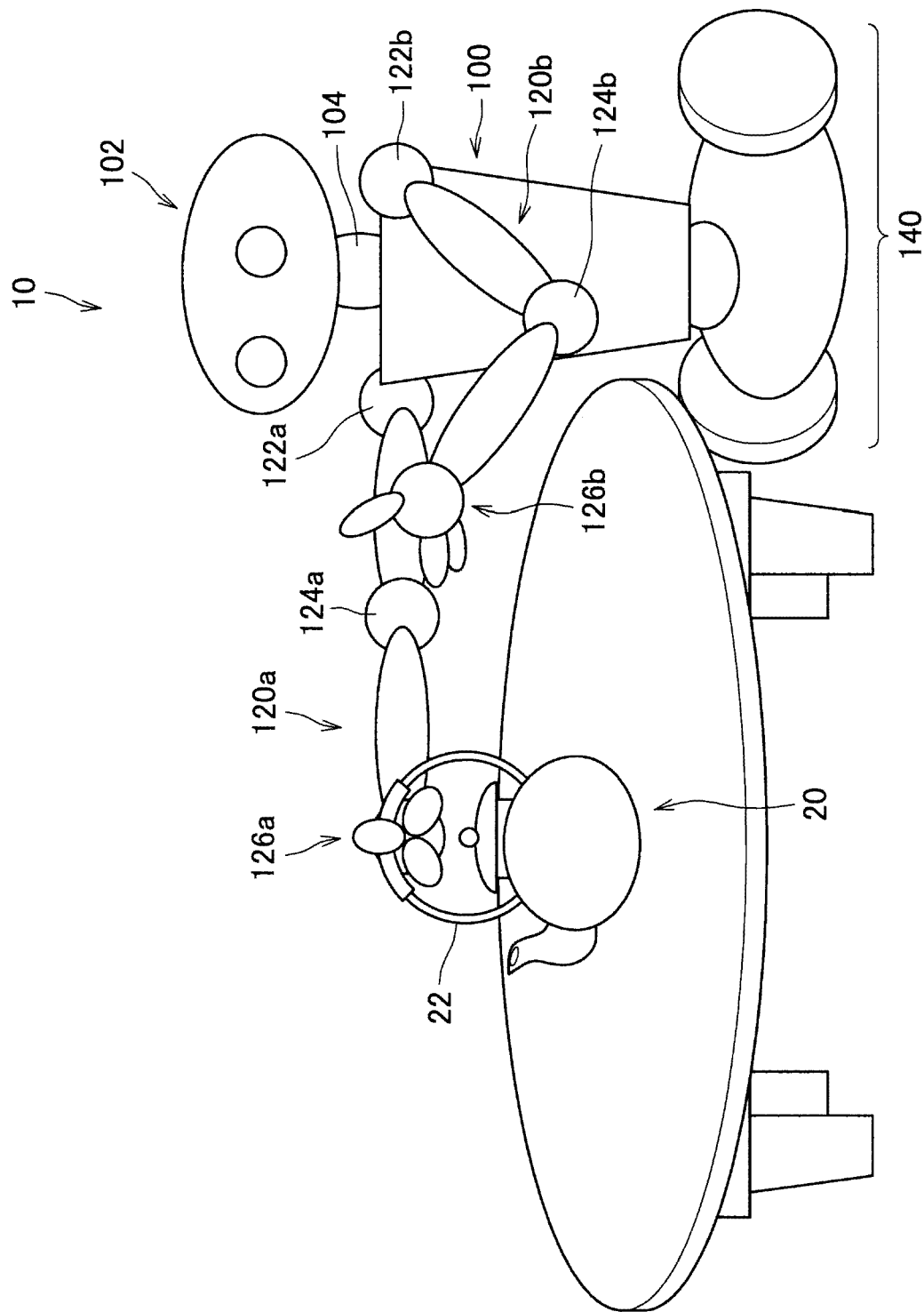
FIG. 1 is a diagram schematically showing an appearance of a robot 10 according to an embodiment of the present disclosure.

A preferred embodiment of the present disclosure will be described in detail below with reference to the accompanying drawings. Note that in the present specification and the drawings, the same reference signs are assigned to constituent elements having substantially the same functional configuration, and duplicate description will be thus omitted.

Furthermore, in the present specification and the drawings, there are also cases where different alphabets are added after the same reference signs assigned to a plurality of constituent elements having substantially the same functional configuration, so as to distinguish the plurality of constituent elements. Multiple constituent elements having substantially the same functional configuration are referred to as, for example, a robot 10a and a robot 10b as necessary so as to distinguish these constituent elements. However, in a case where it is not necessary to particularly distinguish a plurality of constituent elements having substantially the same functional configuration from each other, the same reference sign is simply assigned to each of the plurality of constituent elements. For example, in a case where it is not necessary to particularly distinguish between the robot 10a and the robot 10b, the robot 10a and the robot 10b are simply referred to as robots 10.

Furthermore, the "MODE FOR CARRYING OUT THE INVENTION" will be described in the order of items set forth below.
 1. Background
 2. Detailed Description of Embodiment
 3. Variations

1. BACKGROUND

First, described below is a background that led to creation of the embodiment of the present disclosure. Heretofore, there has been a demand that a robot can perform work such as holding and carrying an object by using an arm portion provided in the robot.

In a case where it is required to increase power that the robot can output, it is conceivable that there is used a method of mounting a larger motor on the robot. However, this method may increase the size of the robot itself, and may thus increase danger. Therefore, it is desirable to be able to output as much power as possible without changing the size of a motor.

As a known technique, there has been proposed a technique for holding an object with left and right arm portions, so as to hold a heavy object. However, with this technique, it is difficult to hold an object (for example, various daily necessities) which, for example, is provided with a handle so as to be easily held by a person in one hand and has a weight equal to or larger than a certain value. The first reason is that it is difficult to hold such an object with a plurality of arm portions. The second reason is that even if an attempt is made to hold such an object with only one of the arm portions, it is difficult to hold the object due to insufficient power, or there is an increase in vibration generated in the arm portion at the time of holding the object.

Accordingly, in view of the above-described circumstances, a robot 10 according to the present embodiment has been created. The robot 10 according to the present embodiment includes a first arm portion 120*a* and a second arm portion 120*b*. The first arm portion 120*a* is connected to a body portion 100 and configured to perform work. The second arm portion 120*b* is connected to the body portion 100 and controlled to support the first arm portion 120*a*. Therefore, it is possible to reduce vibration generated in the first arm portion 120*a* in a situation where the first arm portion 120*a* performs work. Moreover, the first arm portion 120*a* can perform work with further increased output power even without, for example, increasing the size of a motor.

In the present embodiment, the robot 10 may be a machine (apparatus) that can control the movements of the first arm portion 120*a* and the second arm portion 120*b* by using electric and/or magnetic action. For example, the robot 10 is a movable (or fixed) manipulation apparatus. As an example, the robot 10 may be a humanoid autonomous control robot, a quadruped walking robot, an autonomous driving car, a drone, an industrial robot (for example, a robot for assembling a machine or the like), a service robot (for example, a medical robot such as a surgical robot, or a cooking robot), or a toy. Description will be provided below, centering on an example in which the robot 10 is a humanoid autonomous control robot.

2. DETAILED DESCRIPTION OF EMBODIMENT

<2-1. External Configuration>

First, the external configuration of the robot 10 will be described with reference to FIGS. 1 and 2. FIG. 1 is a diagram schematically showing the external configuration of the robot 10. As shown in FIG. 1, the robot 10 includes the body portion 100, a head portion 102, the first arm portion 120*a*, the second arm portion 120*b*, and a movable body 140.

{2-1-1. Head Portion 102}

The head portion 102 is connected to the body portion 100. For example, the head portion 102 and the body portion 100 are connected via a neck portion 104. In this case, the neck portion 104 may be rotatable around a predetermined rotation axis with respect to the body portion 100. Furthermore, the head portion 102 may be rotatable with respect to the neck portion 104, or may be fixed to the neck portion 104.

{2-1-2. Arm Portion 120}

Each of the first arm portion 120*a* and the second arm portion 120*b* can be connected to the body portion 100 in such a way as to be rotatable with respect to the body portion 100. In the present embodiment, the first arm portion 120*a* may be an arm portion that performs main work. Here, the work includes, for example, holding/carrying a target object or pushing and cutting a target object by using a tool (for example, a knife such as a kitchen knife) (held by the first arm portion 120*a*). Furthermore, the second arm portion 120*b* can be controlled to support the first arm portion 120*a* when, for example, the first arm portion 120*a* performs work. As an example, the second arm portion 120*b* is controlled such that the second arm portion 120*b* supports a part of a predetermined force received by the first arm portion 120*a* performing the work. In a case where the work is the holding of a target object, the predetermined force may include gravity acting on the target object.

The second arm portion 120*b* can be controlled to support the first arm portion 120*a* by, for example, lifting the first arm portion 120*a* while being in contact with the first arm portion 120*a*, holding the first arm portion 120*a*, or connecting with the first arm portion 120*a* with a magnet installed in the first arm portion 120*a* or the second arm portion 120*b*.

For example, in a case where the work is the holding of a target object, the second arm portion 120*b* is controlled to support the first arm portion 120*a* from below the first arm portion 120*a*. Furthermore, in a case where the work is to push and cut a target object, the second arm portion 120*b* is controlled to support the first arm portion 120*a* from above the first arm portion 120*a* (holding a tool).

Hereinafter, the external configurations of the first arm portion 120*a* and the second arm portion 120*b* will be described in more detail. As shown in FIGS. 1 and 2, the second arm portion 120*b* can be connected to the body portion 100 on a side opposite to the first arm portion 120*a* with respect to the body portion 100. For example, the first arm portion 120*a* and the second arm portion 120*b* may be respectively connected to the right side and left side of the robot 10, or vice versa. As a variation, both the first arm portion 120*a* and the second arm portion 120*b* may be provided on either one side (for example, the right side).

The first arm portion 120*a* and the second arm portion 120*b* may be configured in a serial link structure. The first arm portion 120*a* and the second arm portion 120*b* may have a plurality of degrees of freedom (for example, seven degrees of freedom).

(2-1-2-1. First Arm Portion 120*a*)

As shown in FIG. 1, the first arm portion 120*a* may include a connecting portion 122*a*, an end effector 126*a*, and at least one joint 124*a* located between the connecting portion 122*a* and the end effector 126*a*. The connecting portion 122*a* is an example of a first connecting portion according to the present disclosure. The connecting portion 122*a* is a portion connected to the body portion 100. For example, the connecting portion 122*a* is a joint.

The end effector 126*a* is an example of a first end effector according to the present disclosure. The end effector 126*a* is located at an end of the first arm portion 120*a* opposite to an end where the connecting portion 122*a* is located. The end effector 126*a* may be configured such that the end effector 126*a* can hold a target, object. For example, the end effector 126*a* may include a plurality of finger portions and hold a target object by bending the plurality of finger portions.

Furthermore, the end effector 126*a* may be provided with various sensors (such as an imaging unit (for example, a camera) and a sound collection unit (for example, a microphone)). For example, sensing results from the various sensors are transmitted to a control unit 160 to be described later, and recognition processing (for example, image recognition) based on the sensing results is performed by the control unit 160. Note that the various sensors may be installed at arbitrary positions between the end effector 126*a* and the connecting portion 122*a* instead of being installed directly on the end effector 126*a*.

Figure 2:
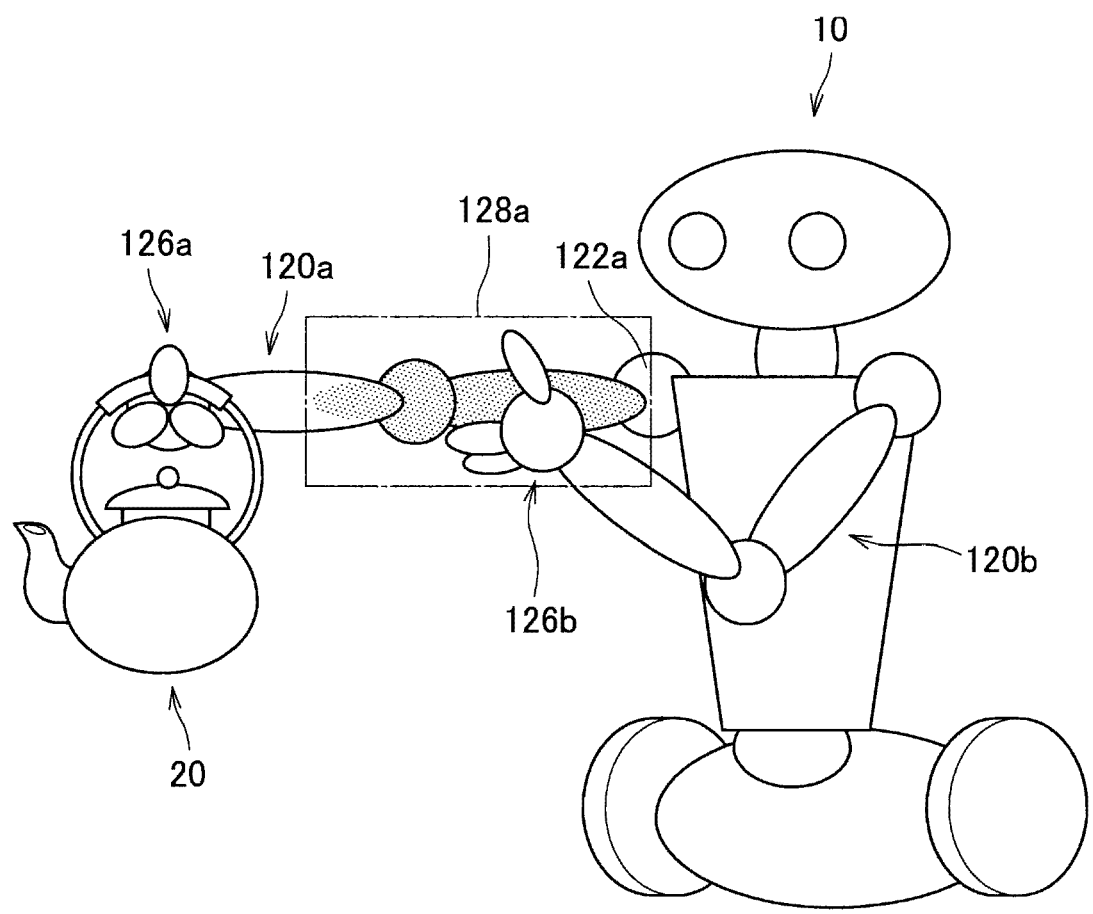
FIG. 2 is another diagram schematically showing the appearance of the robot 10 according to the embodiment.

Furthermore, as shown in FIG. 2, a support target portion 128 may be set, which is located between the connecting portion 122*a* and the end effector 126*a*. Although details will be described later, the support target portion 128 is a portion to be supported when the second arm portion 120*b* supports the first arm portion 120*a*. The range of the support target portion 128 on the first arm portion 120a can be determined in advance. For example, the support target portion 128 may include at least one joint 124a, or may include no joint 124a at all. Furthermore, a position on the support target portion 128 at which the support target portion 128 is to be supported by the second arm portion 120b may be determined in advance or may be determined dynamically. Specific details of the latter will be described later.

The support target portion 128 may include, for example, a predetermined material with high static friction, a predetermined flexible material, or a predetermined ferromagnetic material (for example, a metal exhibiting ferromagnetism at normal temperature). Note that the material of the support target portion 128 may be different from or the same as the material of a part of the first arm portion 120a other than the support target portion 128.

The first arm portion 120a is electrically controlled by the control unit 160 to be described later. For example, one or more actuators 130a are installed inside the first arm portion 120a, and each of the actuators 130a and a power supply (not shown) in the robot 10 can be connected via a power cable disposed in the robot 10. Electricity is supplied from the power supply to each actuator 130a, and each actuator 130a is driven in accordance with the control of the control unit 160. As a result, the first arm portion 120a can operate according to instructions from the control unit 160 (for example, position change or rotation).

(2-1-2-2. Second Arm Portion 120b)

As shown in FIG. 1, the second arm portion 120b may include a connecting portion 122b, an end effector 126b, and at least one joint 124b located between the connecting portion 122b and the end effector 126b. The connecting portion 122b is an example of a second connecting portion according to the present disclosure. The connecting portion 122b is a portion connected to the body portion 100. For example, the connecting portion 122b is a joint.

The end effector 126b is an example of a second end effector according to the present disclosure. The end effector 126b is located at an end of the second arm portion 120b opposite to an end where the connecting portion 122b is located. The end effector 126b may be configured such that the end effector 126b can support (for example, hold) the first arm portion 120a. For example, as shown in FIGS. 1 and 2, the end effector 126b may include a plurality of finger portions and support (for example, hold) the first arm portion 120a by bending the plurality of finger portions. Alternatively, a magnet (such as an electromagnet) may be disposed inside the first arm portion 120a or the end effector 126b. In this case, the end effector 126b may be configured such that the end effector 126b can be connected with the first arm portion 120a by the action of the magnet.

Furthermore, the end effector 126b may be provided with various sensors (such as an imaging unit (for example, a camera) and a sound collection unit (for example, a microphone)). Note that the various sensors may be installed at arbitrary positions between the end effector 126b and the connecting portion 122b instead of being installed directly on the end effector 126b.

The second arm portion 120b is electrically controlled by the control unit 160 (as with the first arm portion 120a). Specifically, the second arm portion 120b may be controlled in a manner similar to the first arm portion 120a.

{2-1-3. Movable Body 140}

The movable body 140 is a mechanism that enables the robot 10 to move. As shown in FIG. 1, the movable body 140 may include a plurality of wheels. However, the present disclosure is not limited to such an example, and the movable body 140 may include a plurality of legs (for example, two legs or four legs) for walking, or may include a mechanism for an endless track such as a caterpillar (registered trademark).

<2-2. Internal Configuration>

Figure 3:
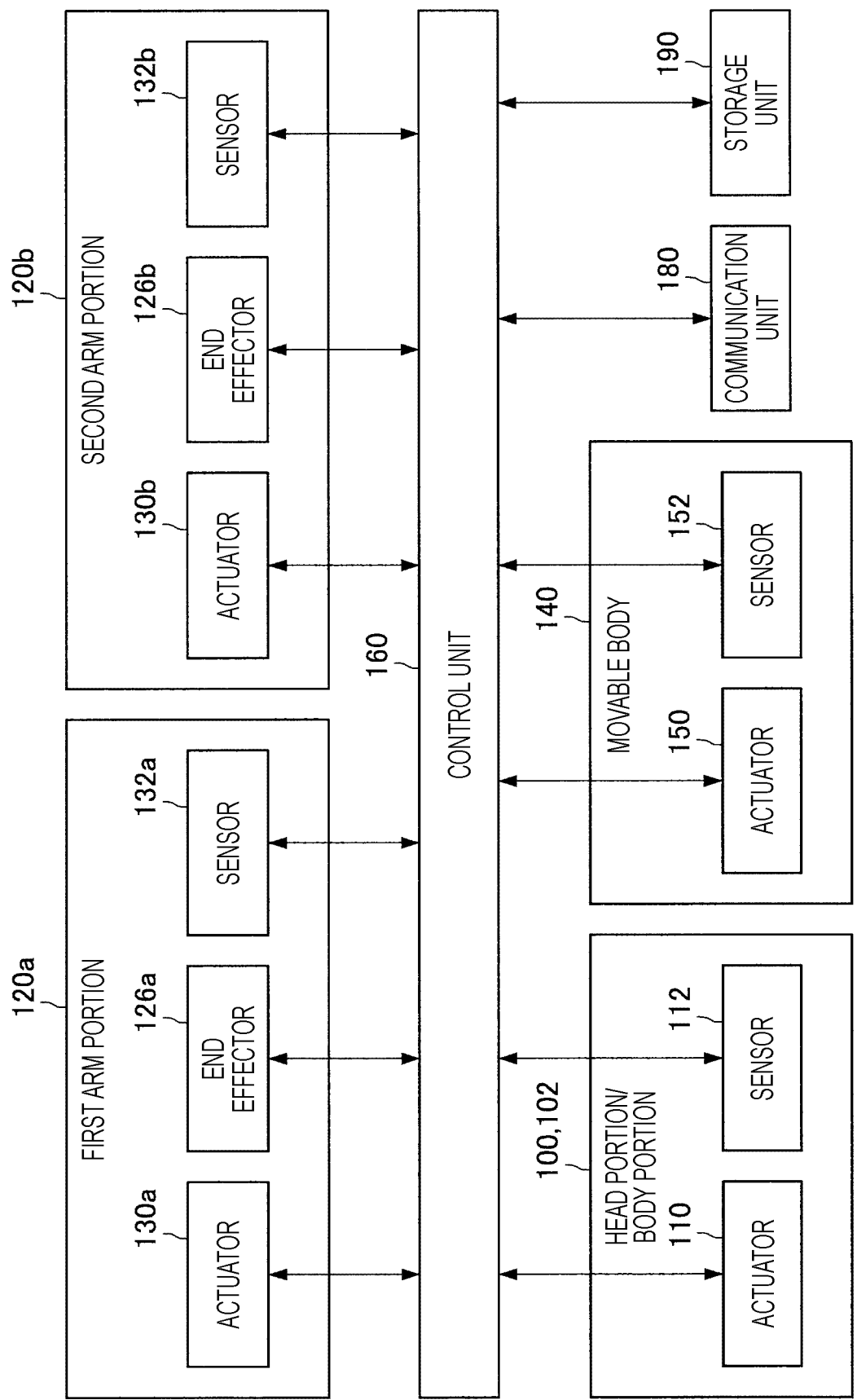
FIG. 3 is a block diagram showing an internal configuration of the robot 10 according to the embodiment.

The external configuration of the robot 10 has been described above. Next, the internal configuration of the robot 10 according to the present embodiment will be described with reference to FIG. 3. FIG. 3 is a block diagram showing the internal configuration of the robot it.

As shown in FIG. 3, the robot 10 includes the control unit 160, the head portion 102, the body portion 100, the first arm portion 120a, the second arm portion 120b, the movable body 140, a communication unit 180, and a storage unit 190. Each of the head portion 102 and the body portion 100 includes one or more actuators 110 and one or more sensors 112. The first arm portion 120a includes the one or more actuators 130a, the end effector 126a, and one or more sensors 132a. The second arm portion 120b includes one or more actuators 130b, the end effector 126a, and one or more sensors 132b. The movable body 140 includes one or more actuators 150 and one or more sensors 152. Description of details overlapping with the above description will be omitted in the following.

{2-2-1. Control. Unit 160}

The control unit 160 may include a processing circuit such as a central processing unit (CPU). The control unit 160 centrally controls the operation of the robot 10. For example, the control unit 160 acquires sensing results from the various sensors in the robot 10, and recognizes an external environment, the position and posture of the robot 10, and the like on the basis of the sensing results. Next, the control unit 160 creates an action plan on the basis of the recognition result and information received from the outside (for example, user instruction information). Then, the control unit 160 controls each actuator in the robot 10 such that the robot 10 acts on the basis of the created plan.

For example, the control unit 160 controls each actuator 150 in the movable body 140 such that the robot 10 moves to a target location specified in the plan. Furthermore, the control unit 160 controls each actuator 130a in the first arm portion 120a so as to change the position and orientation of the first arm portion 120a on the basis of details of work specified in the plan (for example, holding an object or pushing and cutting an object).

(2-2-1-1. Example of Control of Support)

Moreover, the control unit 160 controls the second arm portion 120b on the basis of predetermined condition such that the second arm portion 120b supports the first arm portion 120a. For example, the control unit 160 controls the second arm portion 120b on the basis of the predetermined condition such that the support target portion 128 of the first arm portion 120a is supported by the end effector 126b of the second arm portion 120b.

As an example, in a case where holding a target object is target work specified in the plan, the control unit 160 causes the second arm portion 120b to support the first arm portion 120a, on the basis of a result of determination as to whether or not to hold the target object with the plurality of arm portions. For example, in a case where it is determined that the target object should be held by the plurality of arm portions, the control unit 160 causes the second arm portion 120b to hold the target object, together with the first arm portion 120a. Furthermore, in a case where it is determined that the target object should be held only by the first arm portion 120a, the control unit 160 does not cause the second arm portion 120b to hold the target object. Moreover, in this case, the control unit 160 causes the second arm portion 120b to support the first arm portion 120a, on the basis of a result of determination as to whether or not it is difficult to hold the target object only with the first arm portion 120a.

For example, in a case where, before the first arm portion 120a holds the target object, it is determined that it is difficult to hold the target object only with the first arm portion 120a, the control unit 160 causes the second arm portion 120b to support the first arm portion 120a before the first arm portion 120a holds the target object. Furthermore, assume that while the first arm portion 120a is holding the target object without being supported by the second arm portion 120b, it is determined that it is difficult to hold the target object only with the first arm portion 120a. In such a case, the control unit 160 causes the second arm portion 120b to support the first arm portion 120a at the time of, for example, the determination.

(2-2-1-2. Example of Determining Whether or not to Hold Target Object with Plurality of Arm Portions)

Moreover, the control unit 160 can perform the above-described "determination as to whether or not to hold a target object 20 with the plurality of arm portions" on the basis of a first criterion. For example, before the first arm portion 120a holds the target object 20, the control unit 160 determines whether or not to hold the target object 20 with the plurality of arm portions on the basis of the first criterion. Here, the first criterion may include at least one of the shape of the target object 20 (for example, the presence/absence of a "handle" 22, or a position at which the target object can be held) or the assumed weight of the target object. For example, in a case where the target object 20 includes a handle 22, the control unit 160 determines that the target object 20 should be held only by the first arm portion 120a.

(2-2-1-3. Example of Determination as to Difficulty in Holding Target Object Only with First Arm Portion 120a)

Moreover, the control unit 160 can perform the above-described "determination as to whether or not it is difficult to hold the target object only with the first arm portion 120a" on the basis of a second criterion. For example, while the first arm portion 120a is holding the target object, the control unit 160 determines whether or not it is difficult to hold the target object only with the first arm portion 120a on the basis of the second criterion. Here, the second criterion may include at least one of a result (vibration frequency or the like) of sensing vibration being generated in the first arm portion 120a (for example, the connecting portion 122a or the end effector 126a), the magnitude of torque sensed in the first arm portion 120a (for example, the connecting portion 122a or the end effector 126a), a result of sensing the temperature of each actuator 130 in the first arm portion 120a, or a result of sensing the weight of the target object.

(2-2-1-4. Example of Determination of Support Position)

As a variation, the control unit 160 can also dynamically determine a support position at which the support target portion 128 of the first arm portion 120a is to be supported by the second arm portion 120b, as described above. For example, in a case where the range of the support target portion 128 is predetermined on the first arm portion 120a, the control unit 160 may continuously move a contact position at which the end effector 126b is n contact with the support target portion 128 within the range and dynamically determine a support position at which the support target portion 128 is to be supported by the end effector 126b, on the basis of a predetermined sensing result obtained in the first arm portion 120a during the continuous movement. As an example, assume that when the end effector 126b is located at a specific position during the continuous movement, respective values of one or more predetermined parameters (for example, the weight of the target object sensed in the first arm portion 120a, a result of sensing vibration being generated in the first arm portion 120a (vibration frequency or the like), or the magnitude of torque sensed in the first arm portion 120a) are all within allowable ranges associated with the parameters. Then, the control unit 160 may determine that the specific position of the end effector 126b be the support position.

{2-2-2. Sensor 112, Sensor 132a, Sensor 132b, and Sensor 152}

The sensor 112 performs various types of sensing with respect to the head portion 102 or the body portion 100. The sensor 132a performs various types of sensing with respect to the first arm portion 120a. The sensor 132b performs various types of sensing with respect to the second arm portion 120b. The sensor 152 performs various types of sensing with respect to the movable body 140.

The sensor 112, the sensor 132a, the sensor 132b, and the sensor 152 may each include, for example, an acceleration sensor, a gyroscope, a temperature sensor, a torque sensor, a weight sensor, a camera, and/or a microphone. Note that the functions of the sensor 112, the sensor 132a, the sensor 132b, and the sensor 152 may all be the same or may be at least partially different from each other.

{2-2-3. Actuator 110, Actuator 130a, Actuator 130b, and Actuator 150}

Each actuator (actuator 110, actuator 130a, actuator 130b, and actuator 150) is powered on the basis of electricity supplied from a power supply unit (not shown) in the robot 10 and a control signal transmitted from the control unit 160. Therefore, the head portion 102, the body portion 100, the first arm portion 120a, the second arm portion 120b, and the movable body 140 can implement operation in accordance with the control of the control unit 160.

For example, each of the actuators may include a motor. However, the present disclosure is not limited to such an example, and one or more of the actuators may be a pneumatic actuator, a hydraulic actuator, or a rubber actuator.

{2-2-4. Communication Unit 180}

The communication unit 180 transmits/receives information to/from an external device (not shown) via a network (for example, the Internet or various local area networks (LANs)). For example, the communication unit 180 receives, from an external device, user instruction information regarding the operation of the robot 10.

{2-2-5. Storage Unit 190}

The storage unit 190 stores various data of, for example, a map information DB, an object information DB, and a body information DB, and various applications. Here, the map information DB may be a database storing real-world map information. For example, the object information DB may be a database storing, for each object, position information of the object and attribute information (shape, assumed weight, and the like) of the object. The body information DB may be a database storing information (for example, position, shape, size, and the like) on each part of the robot 10.

<2-3. Flow of Processing>

Figure 4:
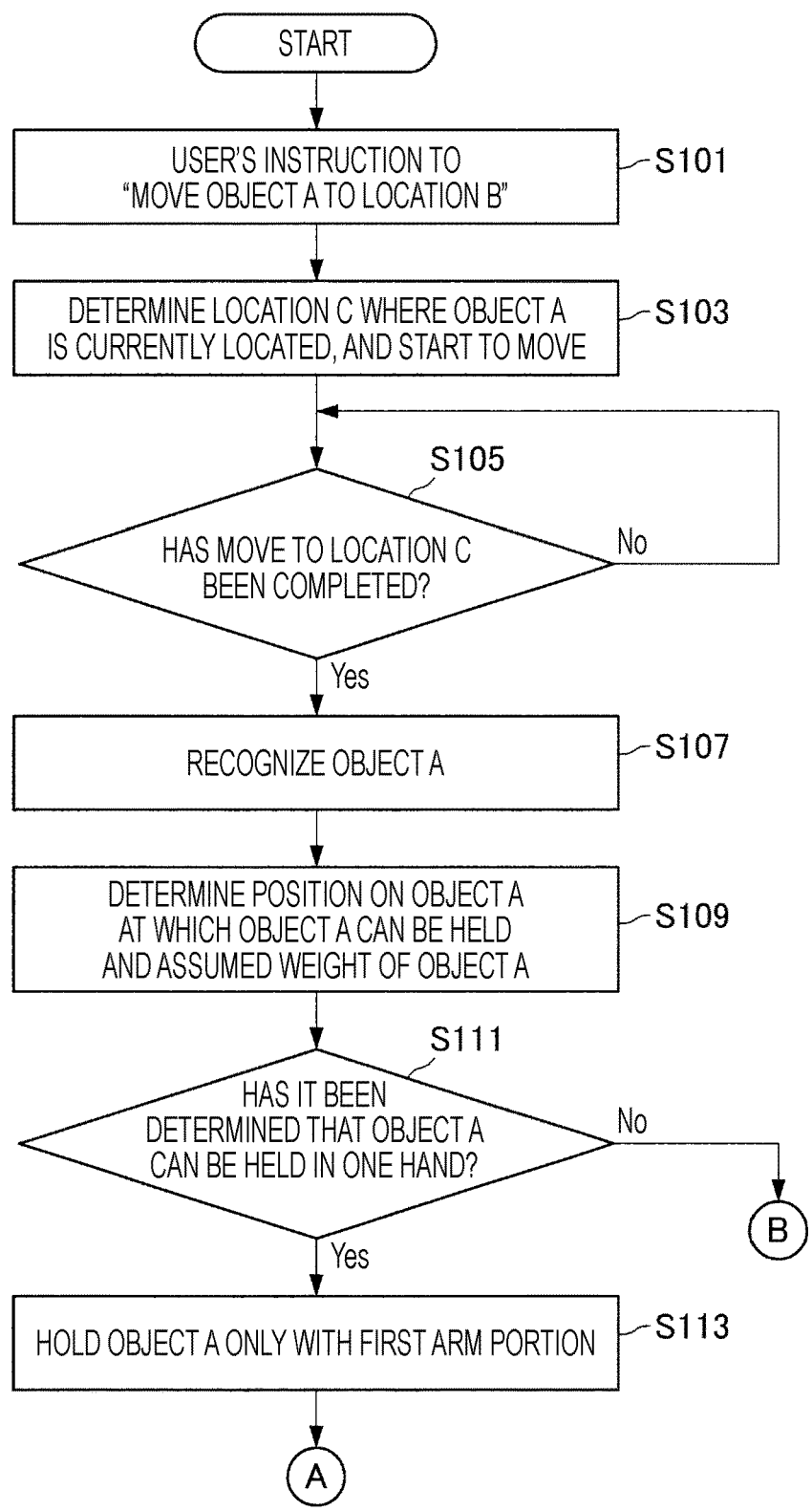
FIG. 4 is a flowchart showing a part of a processing flow according to the embodiment.
Figure 5:
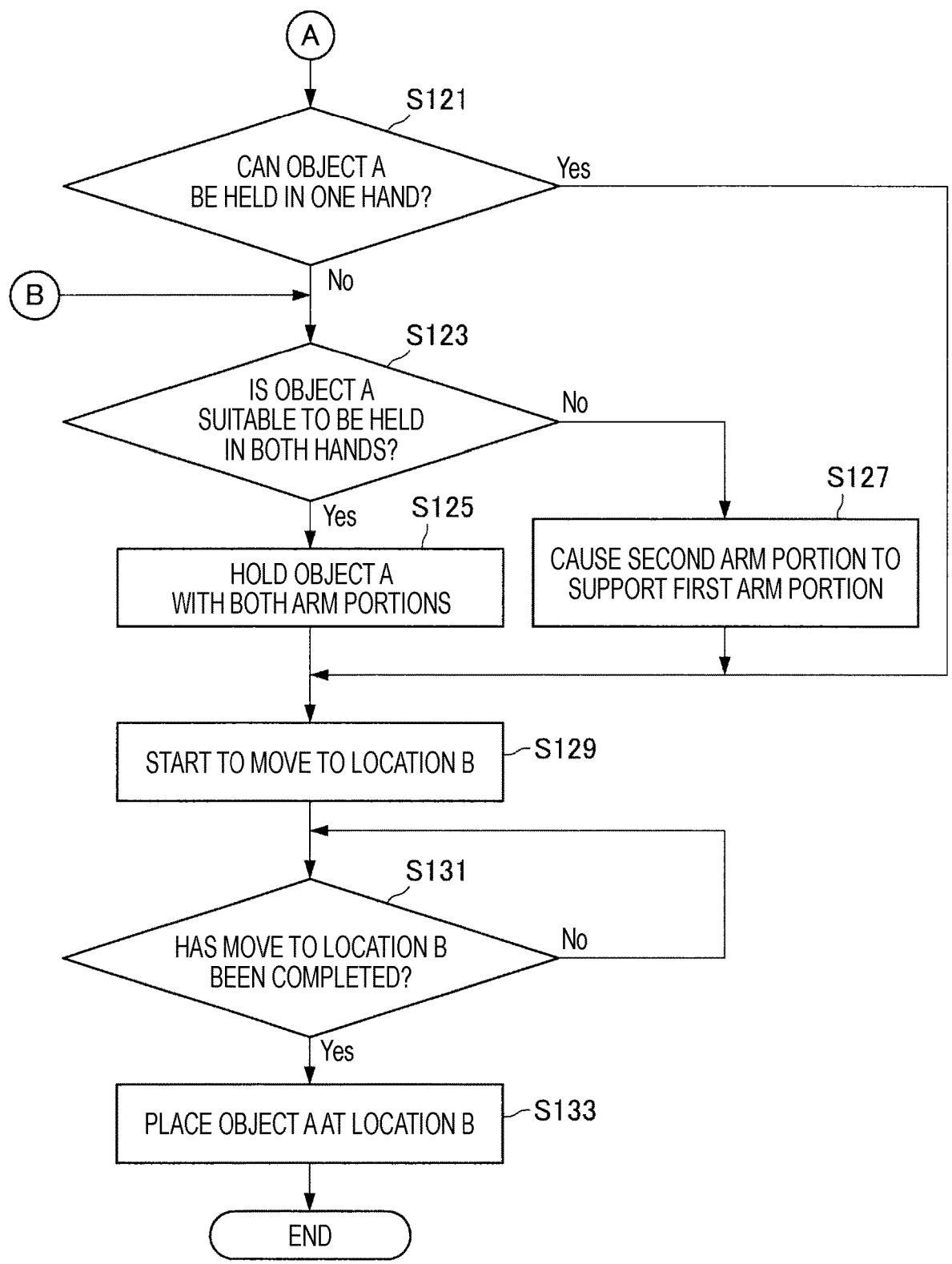
FIG. 5 is a flowchart showing a part of the processing flow according to the embodiment.

The internal configuration of the robot 10 has been described above. Next, the flow of processing according to the present embodiment will be described with reference to FIGS. 4 and 5. FIGS. 4 and 5 are flowcharts showing an example of the flow of processing according to the present embodiment. The following describes an example of a situation where the robot 10 holds and carries an object on the basis of a user instruction.

As shown in FIG. 4, a user first instructs the robot 10 to "move an object A to a location B" by a predetermined operation method (S101).

Thereafter, the control unit 160 of the robot 10 determines a location C where the object A is currently located by referring to, for example, the object information DB, on the basis of the instruction received in S101. Then, the robot 10 starts to move toward the determined location C (S103).

Thereafter, in a case where the move to the location C is completed (S105: Yes), the control unit 160 recognizes the object A on the basis of a result of sensing (captured image or the like) at the current location (S107).

Subsequently, the control unit 160 determines a position on the object A at which the object A can be held and the assumed weight of the object A by referring to, for example, the object information DB (S109).

Subsequently, the control unit 160 determines whether or not values of parameters are all within the ranges of "values indicating that the object A can be held only by the first arm portion 120a". Examples of the parameters include the determined position at which the object A can be held, the determined assumed weight, a result of sensing the temperature of each actuator 130a in the first arm portion 120a, and a result of sensing vibration in the first arm portion 120a. In a case where at least one of the values of these parameters is outside the range of values indicating that the object A can be held only by the first arm portion 120a, the control unit 160 determines that it is difficult to hold the object A only with the first arm portion 120a (S111: No). Then, the control unit 160 performs a process of S123 to be described later.

Meanwhile, in a case where all the values of these parameters are within the ranges of values indicating that the object A can be held only by the first arm portion 120a, the control unit 160 determines that it is possible to hold the object A only with the first arm portion 120a (S111: Yes). Then, the control unit 160 causes the object A to be held only by the first arm portion 120a (S113).

Here, the flow of processing after S113 will be described with reference to FIG. 5. After S113, the control unit 160 determines whether or not values of, for example, the following parameters are all within the ranges of values indicating that the object A can be held only by the first arm portion 120a: the weight of the object A sensed by the sensor 132a in the first arm portion 120a, a result of sensing the temperature of each actuator 130a in the first arm portion 120a after S113, and a result of sensing vibration in the first arm portion 120a after S113 (S121). In a case where all the values of these parameters are within the ranges of values indicating that the object A can be held only by the first arm portion 120a, the control unit 160 determines that it as possible to hold the object A only with the first arm portion 120a (S121: Yes). Then, the robot 10 performs a process of S129 to be described later.

Meanwhile, in a case where at least one of the values of these parameters is outside the range of values indicating that the object A can be held only by the first arm portion 120a, the control unit 160 determines that it is difficult to hold the object A only with the first arm portion 120a (S121: No). Next, the control unit 160 determines whether or not to hold the object A with the plurality of arm portions. For example, the control unit 160 determines whether or not to hold the object A with the plurality of arm portions on the basis of the shape of the object A (S123).

In a case where it is determined that the object A should be held by the plurality of arm portions (S123: Yes), the control unit 160 causes both the first arm portion 120a and the second arm portion 120b to hold the object A (S125). Then, the robot 10 performs a process of S123 to be described later.

Meanwhile, in a case where it is determined that the object A should not be held by the plurality of arm portions (S123: No), the control unit 160 causes the second arm portion 120b to support the first arm portion 120a (S127). Therefore, the first arm portion 120a can hold the object A more stably.

Thereafter, while holding the object A, the robot 10 starts to move toward the location B on the basis of the instruction received in S101 (S129).

Thereafter, in a case where the move to the location B is completed (S131: Yes), the control unit 160 controls the first arm portion 120a so as to place the object A on the ground (S133).

{2-3-1. Variations}

The flow of processing according to the present embodiment is not limited to the example described above. For example, even during the move from the location C to the location B, the control unit 160 may determine, as needed, "whether or not the object A can be held only by the first arm portion 120a", and may change determination as to whether or not to cause the second arm portion 120b to support the first arm portion 120a, according to the determination result. That, is, the robot 10 may perform the processes of 3121 to 3127 as needed even between S129 and S133. According to this variation, in a case where, for example, there is an irregular terrain in the movement path from the location C to the location B and the robot 10 passes through the irregular terrain, it is possible to reduce vibration generated in the first arm portion 120a.

<2-4. Effects>

{2-4-1. Effect 1}

As described above, the robot 10 according to the present embodiment includes the first arm portion 120a and the second arm portion 120b. The first arm portion 120a is connected to the body portion 100 and configured to perform work. The second arm portion 120b is connected to the body portion 100 and controlled to support the first arm portion 120a. Therefore, it is possible to reduce vibration generated in the first arm portion 120a in a situation where the first arm portion 120a performs work. As a result, it is possible to, for example, reduce operational errors or working hours.

{2-4-2. Effect 2}

Moreover, the first arm portion 120a can perform work with further increased output power even without, for example, increasing the size of a motor. For example, in a situation where a target object is held only by the first arm portion 120a, the robot 10 can hold the target object more stably than known techniques. In particular, the robot 10 can hold and carry, more stably than known techniques, an object provided with a handle so as to be easily held by a person in one hand and having a weight equal to or larger than a certain value.

Accordingly, the types of target object that can be held by the robot 10 can also be increased as compared with known techniques, and convenience is thus improved.

{2-4-3. Effect 3}

Moreover, according to the present embodiment, it is possible to reduce a load on the first arm portion 120a by causing the second arm portion 120b to support the first arm portion 120a. Therefore, it is possible to reduce heat generation or adopt a small actuator at the time of design. Accordingly, safety can be improved.

{2-4-4. Effect 4}

Moreover, the imaging unit and the sound collection unit are provided at the tip of the first arm portion 120*a*, and the robot 10 can cause the second arm portion 120*b* to support the first arm portion 120*a* when, for example, extending the first arm portion 120*a*. Therefore, it is possible to reduce vibration of an image captured by the imaging unit. Furthermore, it is possible to reduce the amount of noise included in a result of sound collection by the sound collection unit.

3. VARIATIONS

The preferred embodiment of the present disclosure has been described above in detail with reference to the accompanying drawings. However, the present disclosure is not limited to such an example. It will be apparent to a person having ordinary skill in the art of the present disclosure that various changes or modifications can be conceived within the scope of the technical idea described in the claims. It is understood that, of course, such changes or modifications are also within the technical scope of the present disclosure.

<3-1. Variation 1>

Figure 6:
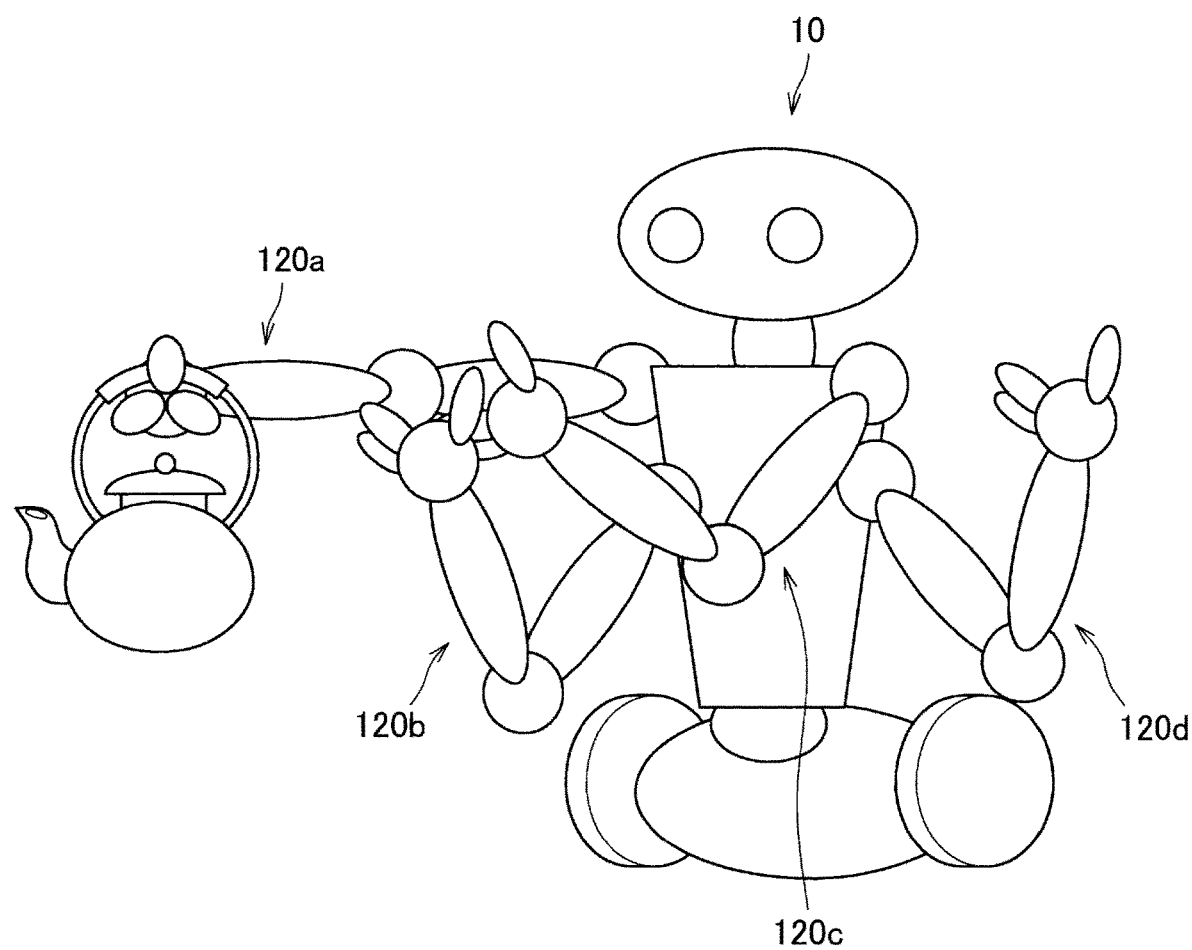
FIG. 6 is a diagram showing an example of an appearance of a robot 10 including three or more arm portions 120, according to a variation of the embodiment.

An example in which the robot 10 includes "two" arm portions has been described in the above embodiment. However, the present disclosure is not limited to such an example. For example, as shown in FIG. 6, three or more arm portions 120 may be connected to the robot 10. That is, the robot 10 may further include a third arm portion 120*c* that is connected to the body portion 100 and controlled such that together with the second arm portion 120*b*, the third arm portion 120*c* supports the first arm portion 120*a*.

In a case where, for example, a target object is held only by the first arm portion 120*a* in this occasion, the robot 10 may dynamically determine the number of arm portions that support the first arm portion 120*a*, on the basis of a predetermined criterion. The predetermined criterion may be, for example, a result of sensing the weight of the target object, a result of sensing the temperature of each actuator 130*a* in the first arm portion 120*a* (holding the target object), and a result of sensing vibration in the first arm portion 120*a*.

<3-2. Variation 2>

Figure 7:
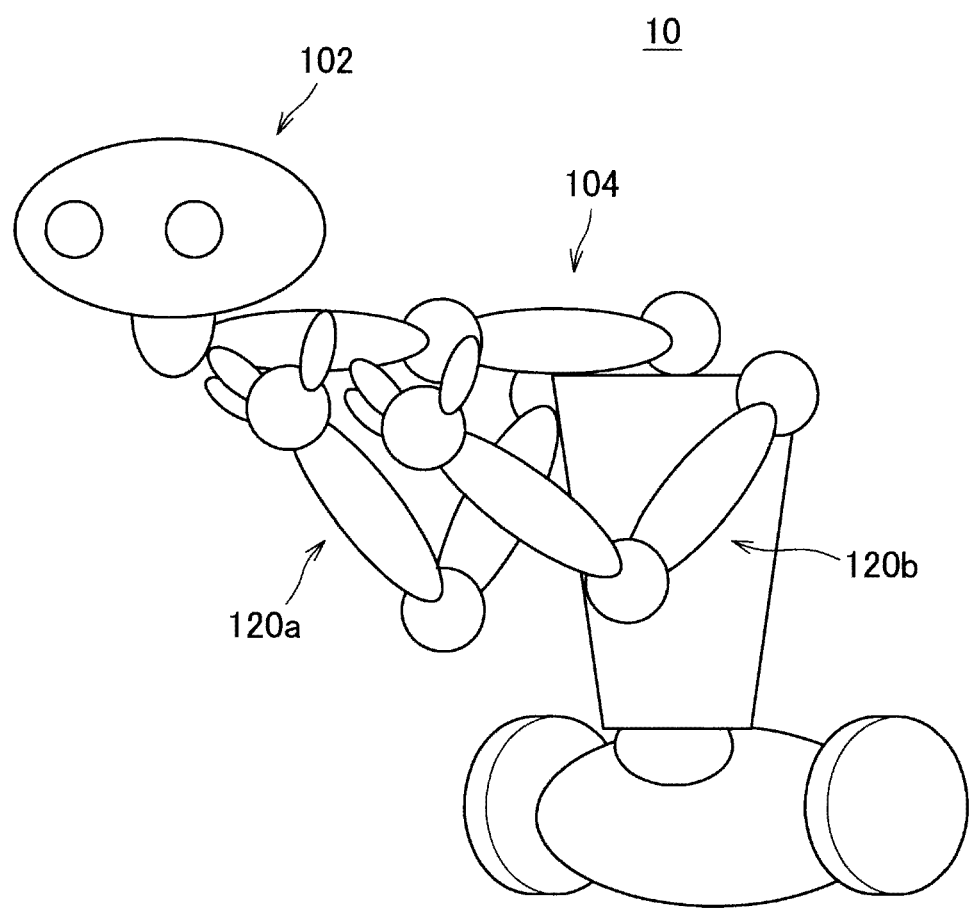
FIG. 7 is a diagram showing an example in which one or more arm portions support a neck portion 104, according to a variation of the embodiment.

Furthermore, an example in which the second arm portion 120*b* supports the first arm portion 120*a* has been described in the above embodiment. However, the present disclosure is not limited to such an example, and the second arm portion 120*b* may support another part. In a case where, for example, the neck portion 104 is stretched in the horizontal direction as shown in FIG. 7, the control unit 160 may cause the second arm portion 120*b* to support the neck portion 104. Therefore, the movement of the head portion 102 can be stabilized. Accordingly, in a case where, for example, the head portion 102 includes a camera, it is possible to further stabilize a camera view as compared to a case where, for example, the neck portion 104 is not supported. The neck portion 104 in this variation is an example of the first arm portion according to the present disclosure.

<3-3. Variation 3>

Furthermore, each step in the above-described processing flow is not always required to be performed in the described order. For example, the order may be changed as appropriate, and each step may be performed in the changed order. Furthermore, some of the steps may be performed in parallel or separately instead of being performed in time series. Moreover, some of the described steps may be omitted or another step may be further added.

In addition, the effects described in the present specification are merely explanatory or illustrative, and not restrictive. That is, the technology according to the present disclosure can achieve other effects obvious to those skilled in the art from descriptions in the present specification, together with or instead of the above-described effects.

Note that the following configurations are also within the technical scope of the present disclosure.

(1)

A robot including:

a first arm portion connected to a body portion and configured to perform work; and a second arm portion connected to the body portion and to be controlled to support the first arm portion.

(2)

The robot according to (1) above, in which the first arm portion includes a first connecting portion connected to the body portion, a first end effector located at an end of the first arm portion opposite to an end where the first connecting portion is located, and a support target portion located between the first connecting portion and the first end effector, and the second arm portion is controlled to support the support target portion.

(3)

The robot according to (2) above, in which the second arm portion includes a second connecting portion connected to the body portion, and a second end effector located at an end of the second arm portion opposite to an end where the second connecting portion is located, and the second arm portion is controlled such that the second arm portion supports the support target portion by bringing the second end effector into contact with the support target portion.

(4)

The robot according to (2) or (3) above, in which the work includes holding a target object, and the second arm portion is controlled to support the first arm portion, on the basis of a result of determination as to whether or not to hold the target object with a plurality of arm portions.

(5)

The robot according to (4) above, in which in a case where it is determined that the target object should be held by the plurality of arm portions, the second arm portion is controlled such that together with the first arm portion, the second arm portion holds the target object, and in a case where it is determined that the target object should not be held by the plurality of arm portions, the second arm portion does not hold the target object, and is controlled to support the first arm portion, on the basis of a result of determination as to whether or not it is difficult to hold the target object only with the first arm portion.

(6)

The robot according to (4) or (5) above, in which whether or not to hold the target object with the plurality of arm portions is determined on the basis of a result of recognizing a shape of the target object and/or an assumed weight of the target object.

(7)

The robot according to (5) or (6) above, in which in a case where, before the first arm portion holds the target object, it is determined that it is difficult to hold the target object only with the first arm portion, the second arm portion is controlled to support the first arm portion before the first arm portion holds the target object.

(8)

The robot according to any one of (5) to (7) above, in which in a case where, while the first arm portion is holding the target object without being supported by the second arm portion, it is deter Coed that it is difficult to hold the target object only with the first arm portion, the second arm portion is controlled to support the first arm portion.

(9)

The robot according to any one of (5) to (8) above, in which whether or not it is difficult to hold the target object only with the first arm portion is determined on the basis of a result of sensing a weight of the target object, a result of sensing vibration in the first arm portion performing the work, or a result of sensing a temperature in the first arm portion performing the work.

(10)

The robot according to any one of (2) to (9) above, in which the first arm portion receives a predetermined force when performing the work, and the second arm portion is controlled to support a part of the predetermined force.

(11)

The robot according to (10) above, in which the work includes holding a target object, and the predetermined force includes gravity acting on the target object.

(12)

The robot according to (10) or (11) above, in which the work includes pushing and cutting a target object by using a tool held by the first arm portion.

(13)

The robot according to any one of (10) to (12) above, is which the support target portion includes at least one joint located between the first connecting portion and the first end effector.

(14)

The robot according to any one of (1) to (13) above, in which the second arm portion is connected to the body portion on a side opposite to the first arm portion with respect to the body portion.

(15)

The robot according to (14) above, further including the body portion.

(16)

The robot according to (15) above, in which the first arm portion includes a first connecting portion connected to the body portion, and an imaging unit or a sound collection unit located at an end of the first arm portion opposite to an end where the first connecting portion is located.

(17)

The robot according to (15) or (16) above, further including a third arm portion connected to the body portion and to be controlled such that together with the second arm portion, the third arm portion supports the first arm portion.

(18)

The robot according to (3) above, in which a support position on the support target portion at which the support target portion is to be supported by the second end effector is determined on the basis of a sensing result in the first arm portion.

(19)

The robot according to (18) above, in which the support position is determined on the basis of a change in a sensing result obtained in the first arm portion while a position of the second end effector is continuously changed in a state where the second end effector is in contact with the support target portion.

(20)

The robot according to any one of (15) to (19) above, further including a control unit that causes the second arm portion to support the first arm portion.

REFERENCE SIGNS LIST

10 Robot
100 Body portion
102 Head portion
104 Neck portion
110, 130a, 130b, 150 Actuator
112, 132a, 132b, 152 Sensor
120a First arm portion
120b Second arm portion
120c Third arm portion
122a, 122b Connecting portion
124a, 124b Joint
126a, 126b End effector
128 Support target portion
140 Movable body
160 Control unit
180 Communication unit
190 Storage unit

The invention claimed is:

1. A robot comprising:
a first arm portion connected to a body portion and configured to perform work; and
a second arm portion connected to the body portion and to be controlled to support the first arm portion, wherein
the first arm portion includes a support target portion,
the second arm portion is controlled to support the support target portion,
the support target portion is supported by the second arm portion at a support position on the support target portion, and
the support position is determined on a basis of a change in a sensing result obtained in the first arm portion while a position of the second arm portion is continuously changed in a state where the second arm portion is in contact with the support target portion.

2. The robot according to claim 1, wherein
the first arm portion includes a first connecting portion connected to the body portion, a first end effector located at an end of the first arm portion opposite to an end where the first connecting portion is located, and the support target portion located between the first connecting portion and the first end effector, and
the second arm portion is controlled to support the support target portion.

3. The robot according to claim 2, wherein
the second arm portion includes a second connecting portion connected to the body portion, and a second end effector located at an end of the second arm portion opposite to an end where the second connecting portion is located, and
the second arm portion is controlled such that the second arm portion supports the support target portion by bringing the second end effector into contact with the support target portion.

4. The robot according to claim 3, wherein the support position on the support target portion at which the support target portion is to be supported by the second end effector is determined on a basis of a sensing result in the first arm portion.

5. The robot according to claim 4, wherein the support position is determined on a basis of the change in the sensing result obtained in the first arm portion while a position of the second end effector is continuously changed in a state where the second end effector is in contact with the support target portion.

6. The robot according to claim 2, wherein
the work includes holding a target object, and
the second arm portion is controlled to support the first arm portion, on a basis of a result of determination as to whether or not to hold the target object with a plurality of arm portions.

7. The robot according to claim 6, wherein
in a case where it is determined that the target object should be held by the plurality of arm portions, the second arm portion is controlled such that together with the first arm portion, the second arm portion holds the target object, and
in a case where it is determined that the target object should not be held by the plurality of arm portions, the second arm portion does not hold the target object, and is controlled to support the first arm portion, on a basis of a result of determination as to whether or not it is difficult to hold the target object only with the first arm portion.

8. The robot according to claim 7, wherein in a case where, before the first arm portion holds the target object, it is determined that it is difficult to hold the target object only with the first arm portion, the second arm portion is controlled to support the first arm portion before the first arm portion holds the target object.

9. The robot according to claim 7, wherein in a case where, while the first arm portion is holding the target object without being supported by the second arm portion, it is determined that it is difficult to hold the target object only with the first arm portion, the second arm portion is controlled to support the first arm portion.

10. The robot according to claim 7, wherein whether or not it is difficult to hold the target object only with the first arm portion is determined on a basis of a result of sensing a weight of the target object, a result of sensing vibration in the first arm portion performing the work, or a result of sensing a temperature in the first arm portion performing the work.

11. The robot according to claim 6, wherein whether or not to hold the target object with the plurality of arm portions is determined on a basis of a result of recognizing a shape of the target object and/or an assumed weight of the target object.

12. The robot according to claim 2, wherein
the first arm portion receives a predetermined force when performing the work, and
the second arm portion is controlled to support a part of the predetermined force.

13. The robot according to claim 12, wherein
the work includes holding a target object, and
the predetermined force includes gravity acting on the target object.

14. The robot according to claim 12, wherein the work includes pushing and cutting a target object by using a tool held by the first arm portion.

15. The robot according to claim 12, wherein the support target portion includes at least one joint located between the first connecting portion and the first end effector.

16. The robot according to claim 1, wherein the second arm portion is connected to the body portion on a side opposite to the first arm portion with respect to the body portion.

17. The robot according to claim 16, further comprising the body portion.

18. The robot according to claim 17, wherein the first arm portion includes a first connecting portion connected to the body portion, and an imaging unit or a sound collection unit located at an end of the first arm portion opposite to an end where the first connecting portion is located,
wherein the imaging unit and the sound collection unit are each implemented via at least one processor.

19. The robot according to claim 17, further comprising a third arm portion connected to the body portion and to be controlled such that together with the second arm portion, the third arm portion supports the first arm portion.

20. The robot according to claim 17, further comprising a control unit configured to cause the second arm portion to support the first arm portion,
wherein the control unit is implemented via at least one processor.

* * * * *